(12) United States Patent
Deng et al.

(10) Patent No.: US 11,233,639 B2
(45) Date of Patent: Jan. 25, 2022

(54) METHOD AND DEVICE FOR QUANTUM KEY FUSION-BASED VIRTUAL POWER PLANT SECURITY COMMUNICATION AND MEDIUM

(71) Applicants: BEIJING GUODIAN TONG NETWORK TECHNOLOGY CO., LTD, Beijing (CN); NORTH CHINA ELECTRIC POWER UNIVERSITY, Beijing (CN); STATE GRID CORPORATION OF CHINA, Beijing (CN)

(72) Inventors: Wei Deng, Beijing (CN); Wenzhao Wu, Beijing (CN); Zhuozhi Yu, Beijing (CN); Yefeng Zhang, Beijing (CN); Bingyang Han, Beijing (CN); Man Leng, Beijing (CN); Yonghong Ma, Beijing (CN); Jinglun Zhang, Beijing (CN); Runze Wu, Beijing (CN); Wenwei Chen, Beijing (CN); Nanxiang Li, Beijing (CN); Yukun Zhu, Beijing (CN)

(73) Assignees: BEIJING GUODIAN TONG NETWORK TECHNOLOGY CO., LTD, Beijing (CN); NORTH CHINA ELECTRIC POWER UNIVERSITY, Beijing (CN); STATE GRID CORPORATION OF CHINA, Beijing (CN)

( * ) Notice: Subject to any disclaimer, the term of this patent is extended or adjusted under 35 U.S.C. 154(b) by 173 days.

(21) Appl. No.: 16/481,215

(22) PCT Filed: Aug. 24, 2018

(86) PCT No.: PCT/CN2018/102358
§ 371 (c)(1),
(2) Date: Jul. 26, 2019

(87) PCT Pub. No.: WO2019/137014
PCT Pub. Date: Jul. 18, 2019

(65) Prior Publication Data
US 2019/0394031 A1   Dec. 26, 2019

(30) Foreign Application Priority Data
Jan. 11, 2018   (CN) .......................... 201810025965.4

(51) Int. Cl.
*H04L 9/08* (2006.01)
*H04L 9/06* (2006.01)

(52) U.S. Cl.
CPC .......... *H04L 9/0852* (2013.01); *H04L 9/0643* (2013.01); *H04L 9/0822* (2013.01);
(Continued)

(58) Field of Classification Search
None
See application file for complete search history.

(56) References Cited

FOREIGN PATENT DOCUMENTS

| CN | 107404461 A | * 11/2017 | ......... H04L 63/0869 |
| CN | 107404461 A | 11/2017 | |

(Continued)

OTHER PUBLICATIONS

"Morteza Shabanzadeh, Mohammad-Kazem, Sheikh-El-Eslami, Mahmoud-Reza Haghifam, An interactive cooperation model for neighboring virtual power plants, 2017, Faculty of Electrical and Computer Engineering, Tarbiat Modares University." (Year: 2017).*

(Continued)

*Primary Examiner* — Jeffrey C Pwu
*Assistant Examiner* — Mayasa A. Shaawat
(74) *Attorney, Agent, or Firm* — Syncoda LLC; Feng Ma (57) ABSTRACT

A method for quantum key fusion-based virtual power plant security communication includes: identity authentication, performing identity authentication between a client and a server in a virtual power plant based on a communication requirement to acquire a root key; key distribution: generating a key encryption key and a message authentication key (Continued)

based on the acquired root key and performing negotiation on a data encryption key to obtain the data encryption key; and data encryption: encrypting to-be-encrypted data using the data encryption key, and implementing communication of the data. During the identity authentication or the key distribution, negotiation on a quantum key is performed by a quantum key server, and the quantum key obtained by the negotiation is used for implementing the identity authentication or used as the data encryption key. A device for quantum key fusion-based virtual power plant security communication and a computer storage medium are provided.

13 Claims, 5 Drawing Sheets

(52) U.S. Cl.
CPC .......... *H04L 9/0844* (2013.01); *H04L 9/0866* (2013.01); *H04L 9/0894* (2013.01)

(56) References Cited

FOREIGN PATENT DOCUMENTS

| | | | |
|---|---|---|---|
| CN | 107480847 A | | 12/2017 |
| CN | 107493169 A | * | 12/2017 |
| CN | 107493169 A | | 12/2017 |
| CN | 108234501 A | | 6/2018 |
| WO | 2017200791 A1 | | 11/2017 |

OTHER PUBLICATIONS

International Search Report in the international application No. PCT/CN2018/102358, dated Oct. 29, 2018.
Written Opinion of the International Search Authority in the international application No. PCT/CN2018/102358, dated Oct. 29, 2018.
Li, Zhi. "The Research of Key Technique on the Network Security for Power System", Non-official translation: Science-Engineering (B), Chinese Selected Doctoral Dissertations and Master's Theses Full-Text Databases (Master), No. 4, 2004, Dec. 15, 2004 (Dec. 15, 2004), entire document.
Fang, Yanqiong et al. "A Review on Virtual Power Plant", No. 04, 2016, Apr. 30, 2016 (Apr. 30, 2016), entire document.
Shabanzadeh, M. et al. "An Interactive Cooperation Model for Neighboring Virtual Power Plants"; Applied Energy 200(2017), May 18, 2017 (May 18, 2017), entire document.
First Office Action of the Chinese application No. 201810025965.4, dated Apr. 8, 2020.

* cited by examiner

METHOD AND DEVICE FOR QUANTUM KEY FUSION-BASED VIRTUAL POWER PLANT SECURITY COMMUNICATION AND MEDIUM

TECHNICAL FIELD

The disclosure relates to, but is not limited to, the technical field of electricity, and particularly to a method and device for quantum key-based fusion virtual power plant security communication, and a computer storage medium.

BACKGROUND

At present, with emergence of the grid-connected power generation of huge amounts of different types of new energy and distributed power generation devices, new severe challenges arise from electrical grid dispatching and security operation. A virtual power plant is an effective form for reasonably integrating and optimally utilizing distributed new energy, and can also effectively participate in an energy exchange process of an electricity market. However, present studies on the virtual power plants mainly concerns an issue of economical and reliable operation of electric power systems, and mainly includes work aspects of energy management, system operation, optimizing dispatching, predictive modeling and the like. There are no studies yet highly correlated with how to guarantee information communication security and ensure reliable operation of the Internet of energy on the basis of technologies of advanced password, identity authentication, encryption communication and the like.

Conventional information security approaches depend on computational complexity of mathematical problems. Nowadays, with rapid development of numerical computation capabilities such as distributed computing, cloud computing, quantum computing, security of data transmission cannot be guaranteed with conventional cryptography. Long-term and absolute security of information transmission can be guaranteed with quantum cryptography due to physical theorems such as the quantum uncertainty principle, quantum state measurement collapsing and unknown quantum state no-cloning. In recent years, although information security of electric power systems has attracted extensive attentions of people, and some studies is performed on introduction of quantum key distribution technologies to the electric power systems, it can be seen from the existing study achievement that discussion in the existing work is performed solely from the perspective of quantum key technologies, or application quantum technologies are only proposed simply in electric power systems, and the electric service system is not combined deeply with the achievement. Therefore, it is difficult to implement efficient and secure communication, particularly for communication related to virtual power plants.

SUMMARY

The objective of the disclosure is to provide a method and a device for quantum key fusion-based virtual power plant security communication, and a computer storage medium.

A method for quantum key fusion-based virtual power plant security communication is provided according to an embodiment of the disclosure, which includes:

identity authentication: performing the identity authentication between a client and a server in a virtual power plant based on a communication requirement, to acquire a root key, where the server includes a commercial virtual power plant, an electricity market service system or a technical virtual power plant, and the client includes a distributed energy resource, a commercial virtual power plant or a technical virtual power plant;

key distribution: generating a key encryption key and a message authentication key based on the acquired root key, and performing negotiation on a data encryption key to obtain the data encryption key; and data encryption: encrypting to-be-encrypted data using the data encryption key, and implementing communication of the data.

Negotiation on a quantum key is performed by a quantum key server during the identity authentication or the key distribution, and the quantum key obtained by the negotiation is used for implementing the identity authentication or used as the data encryption key.

A device for quantum key fusion-based virtual power plant security communication is further provided according to an embodiment of the disclosure, which includes:

an identity authentication module configured for identity authentication, which includes performing identity authentication between a client and a server in the virtual power plant based on a communication requirement, to acquire a root key, where the server includes a commercial virtual power plant, an electricity market service system or a technical virtual power plant, and the client includes a distributed energy resource, a commercial virtual power plant or a technical virtual power plant.

a distribution module configured for key distribution. which includes generating a key encryption key and a message authentication key based on the acquired root key, and performing negotiation on a data encryption key to obtain the data encryption key; and an encryption module configured for data encryption, which includes encrypting to-be-encrypted data using the data encryption key, and implementing communication of the data.

A quantum key server is configured to implement negotiation on a quantum key during the identity authentication or the key distribution, and the quantum key obtained by the negotiation is used for implementing the identity authentication or used as the data encryption key.

A computer storage medium is further provided according to an embodiment of the disclosure, on which a computer-executable instruction is stored. The computer-executable instruction, when being executed, implements the method for quantum key fusion-based virtual power plant security communication described above.

With the method for quantum key fusion-based virtual power plant security communication in the embodiments of the disclosure, security communication of the virtual power plant is implemented by fusing a quantum key manner and a classical encryption manner, which may not only avoid an excessive increase in cost but also greatly improve data security in a communication process. Therefore, a safe, reliable, economical and effective security communication method is provided in the disclosure, thereby improving communication security and reliability of the virtual power plant.

DETAILED DESCRIPTION

For making purposes, technical solutions and advantages of the disclosure clearer, the disclosure is further described in detail below in combination with specific embodiments with reference to the drawings.

It should be noted that all expressions made with "first" and "second" in the embodiments of the disclosure are used to distinguish two different entities or different parameters with the same name, and thus it can be seen that "first" and "second" are only used for convenient expression and should not be understood as a limit to the embodiments of the disclosure, which is not illustrated in the subsequent embodiments.

In the disclosure, regarding high cost of a quantum product in the existing encryption communication situation, a common classical key and a quantum key may be fused, and a method for quantum key fusion-based virtual power plant security communication is further disclosed, which has a good application prospect.

Figure 1:
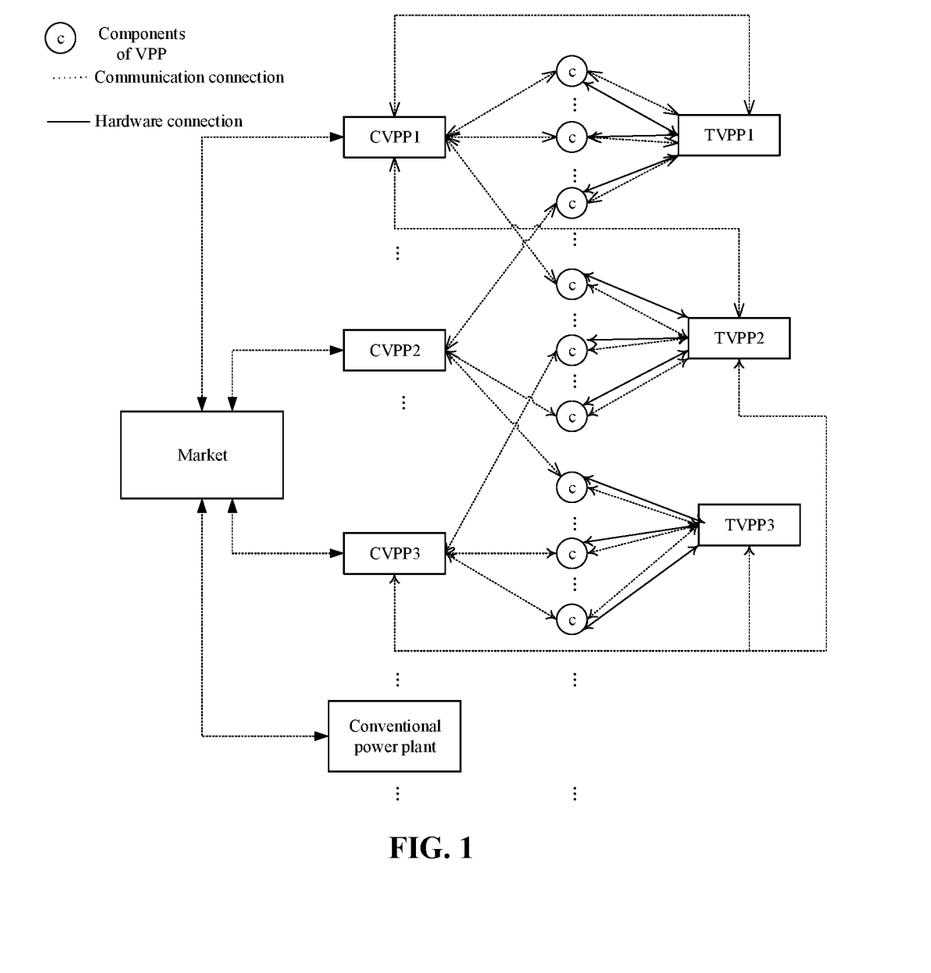
FIG. 1 is a structural diagram of a communication network of a virtual power plant according to an embodiment of the disclosure.

For understanding the solutions of the disclosure more clearly, information on a virtual power plant is explained at first as follows. Communication in the virtual power plant usually includes unicast communication between a commercial virtual power plant (CVPP) and a distributed energy resource (DER), between the CVPP and an electricity market service system, between the CVPP and a technical virtual power plant (TVPP) and between the TVPP and the DER, and multicast communication between the electricity market service system and the CVPP. With reference to FIG. 1 which is a structure diagram of a communication network of a virtual power plant according to the disclosure, it can be seen from FIG. 1 that the electricity market service system is usually connected with multiple commercial virtual power plants (CVPPs) and a conventional power plant, and each of the commercial virtual power plants (CVPPs) is connected with different technical virtual power plants (TVPPs). Herein, quantum communication is supported by the following devices: a quantum channel configured for transmitting quantum information; a quantum trusted relay device configured as a trusted relay of a quantum key; a quantum key server configured for generating and managing a quantum key; a classical channel configured for transmitting classical information except the quantum key; a quantum random number generator configured for generating a quantum random number as a key to be sent to the quantum key server and a quantum key management device which belongs to the quantum key server; and a quantum key management device at the client configured for generating a related service key.

Figure 5:
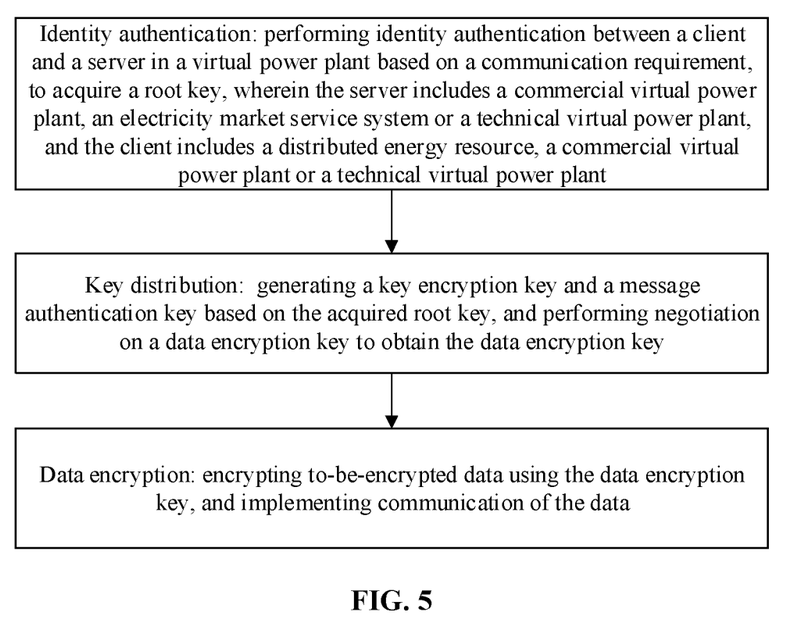
FIG. 5 is a flowchart of a method for quantum key fusion-based virtual power plant security communication according to an embodiment of the disclosure.

In some embodiments of the disclosure, referring to FIG. 5, the method for quantum key fusion-based virtual power plant security communication includes identity authentication, key distribution and data encryption.

(1) Identity authentication is performed between a client and a server in a virtual power plant based on a communication requirement, to acquire a root key. The server includes a commercial virtual power plant, an electricity market service system or a technical virtual power plant, and the client includes a distributed energy resource, a commercial virtual power plant or a technical virtual power plant. For example, the server is a commercial virtual power plant (CVPP) and the client is a distributed energy resource (DER).

In some embodiments of the disclosure, the identity authentication is implemented in a certificate authentication manner. In the certificate authentication manner, a certificate is issued to both the client and the server by a trusted third party.

The identify authentication in the certificate authentication manner includes the following steps.

The client sends information containing identity information ID_C1, a client certificate such as X.509, a client hash value and a random number Nh to the server.

The server receives the information sent by the client, verifies the information. If verification on the information is successful, the server provides a root key, i.e., an authorization key (AK), encrypts the root key using a public key in the certificate and sends the encrypted root key to the client.

The client decrypts the encrypted root key using a private key corresponding to the public key to obtain the root key to implement identity authentication.

Figure 2:
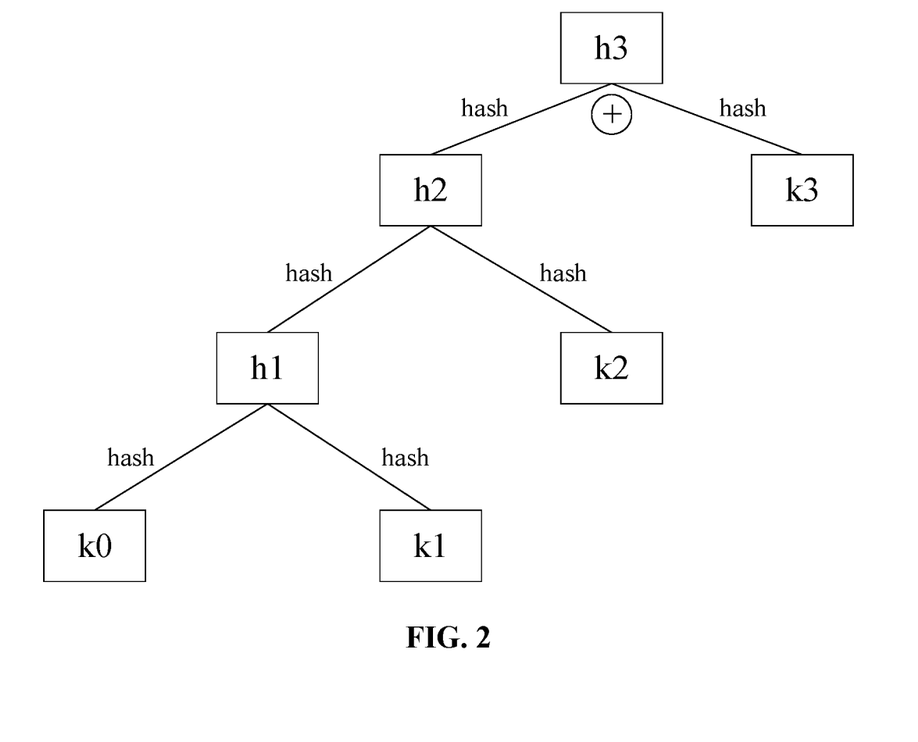
FIG. 2 is a schematic diagram showing a relationship between a hash value of an encryption key and a hash value of a historical key according to an embodiment of the disclosure.

In some other embodiments of the disclosure, the identity authentication is implemented with a fast authentication approach. Herein, each of the client and the server has a historical data index table. The historical data index table includes items of time, identity information, a historical key and a historical hash value. In each session between the client and the server, a key k recorded as $k_0, k_1, k_2 \ldots$, or $k_n$ may be generated, and a historical key hash value recorded as $h_1, h_2, h_3 \ldots$, or $h_n$, may be generated. An exclusive or operation is performed on a hash value of k and the hash value h to obtain a new historical key hash value. Referring to FIG. 2, $h_n$ is calculated according to the following formulae.

$$h_1 = SHA1[k_0] \oplus SHA1[k_1], \text{ and}$$

$$h_n = SHA1[h_{n-1}] \oplus SHA1[k_n].$$

where n denotes a natural number larger than 1 and SHA1 denotes a hash algorithm.

Authentication is performed on the client and the server based on the historical data index table.

The root key is provided if the authentication is successful.

In some embodiments, the step that authentication is performed on the client and the server based on the historical data index table further includes operations as follows.

The client extracts a previous key value k, previous time Ti and an index value ind in the index table from the historical data index table.

The client calculates a hash value using the previous key value, the previous time and the index value, and sends the hash value along with the identity information of the client and the random number to the server as a message. The message is encrypted using the previous key value and is attached with the index value.

The message is represented as $ESM4[SHA1(k|Ti|Ni|ind)|ID\_DER|Ni]_k|ind$.

where ESM4 denotes a commercial cryptographic algorithm, k denotes an encryption key, Ti denotes previous time, Ni denotes a random number, ind denotes an index value and ID_DER denotes identity information of the client.

After the above message is received, the server retrieves and extracts information corresponding to the index value in the message from the historical data index table at the server according to the index value, decrypts the message using the encryption key, compares the identity information of the client obtained by decryption to acquire an identity of the client, calculates a hash value using a previous time, an encryption key, an index value and a random number corresponding to the index value in the index table, and compares the calculated hash value with the hash value sent by the client. If the calculated hash value is consistent with the hash value sent by the client, the server confirms that the identity of the client is real and effective, and the client is admitted, and updates the historical hash value, the historical key and time information in the historical data index table. If the calculated hash value is not consistent with the hash value sent by the client, the identity authentication is failed, and communication is interrupted. At this point, the server ends identity authentication on the client, and generates a root key after successful authentication to prepare for key distribution.

The server generates a new random number Nj, and sends information about the confirmation along with new time T to the client as a message. The message is encrypted using k according to an encryption formula represented as Encrypt $(Nj|T)_k$.

After the message is received, the client decrypts the message to obtain the new random number Nj and the new time T.

The server and the client calculate a new root key AK based on the random numbers Ni and Nj, the new time T and the new historical hash value h according to a calculation formula for the root key AK represented as follows:

AK=Truncate_128[SHA1(Ni|Nj|T|h)], where Truncate_128 represents extracting first 128 bits of a digit.

In such a manner, an attacker, even though cracking the key k, may not obtain the new root key AK because no historical hash value can be obtained.

In some embodiments of the disclosure, negotiation on a quantum key may also be performed by a quantum key server during the identity authentication. Herein, each of the client and the server has a quantum key server, and the client is provided with a quantum key management device. Before the client communicates with the server, the quantum key management device of the client is bound and registered at the quantum key server in advance, and the quantum key server instructs the quantum random number generator to generate a large number of random numbers, to be stored as keys in the quantum key server and the quantum key management device of the client. The quantum key management device of the client and the quantum key server L2 share the quantum random numbers as the keys, and the server is directly connected with the quantum key server L1.

The identity authentication is implemented with the quantum key through the following steps.

The client sends a data transmission request to the server.

After the request is received, the server generates a random number Nb, and sends the random number Nb and a quantum identity authentication requirement to the client.

After the quantum identity authentication requirement is received, the client sends service information to the bound quantum key server L2 through the quantum key management device QC of the client. The information includes information about that the server requests performing quantum identity authentication on the client.

After the service information of the client is received by the quantum key server L2, negotiation on a quantum key is performed between the quantum key server L1 of the server and the quantum key server L2 of the client. After negotiation on the quantum key is completed, the client and the server obtain a key K_QU1 agreed.

The server generates a random number as a root key AK, calculates a signal E=AK⊕K_QU1 and sends the signal E to the quantum key server L2 through a classical channel.

After the signal E is received, the quantum key server L2 calculates AK'=E⊕K_QU1, selects a quantum random number Ni pre-stored between the client and the quantum key server L2 and calculates ST=AK'⊕Ni. Then, the quantum key server L2 sends a message containing ST, a pointer ptr of the random number Ni, a length long and hash (AK') to the client.

After the message is received, the client extracts the random number Ni using the pointer ptr of the random number and the length long, calculates AK"=ST⊕Ni and sends a message digest HMAC(AK")$_{Nb}$ to the server.

After the above message digest is received, the server calculates HMAC(AK)$_{Nb}$ and determines whether HMAC(AK)$_{Nb}$ is consistent with HMAC(AK")$_{Nb}$. If HMAC(AK)$_{Nb}$ is consistent with HMAC(AK")$_{Nb}$, the servers confirms the identity of the client and uses the AK as the root key. If HMAC(AK)$_{Nb}$ is not consistent with HMAC(AK")$_{Nb}$, the server determines that the authentication is failed and ends the communication.

In some embodiments, a wireless communication device may be used to send and receive data, to solve a problem that communication wiring is difficult due to a wide distribution of clients. Under a wireless communication condition, the quantum key management device of the client may obtain the quantum random number by periodically copying from the key management server using a universal serial bus (USB). Then, data in the application layer may be encrypted using the key, and data in a low layer may be encrypted with assistance of the 802.16 protocol.

Figure 3:
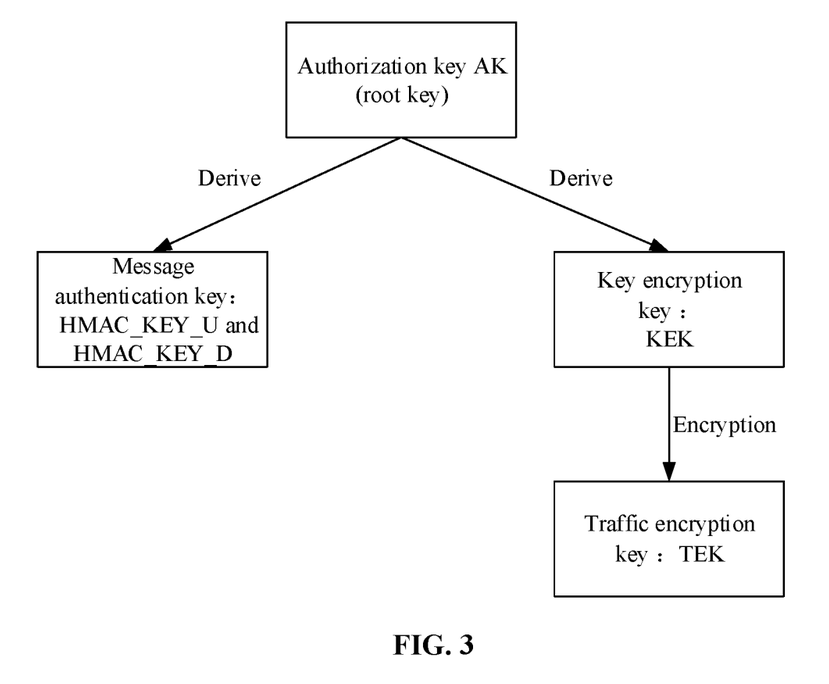
FIG. 3 is a schematic diagram showing a relationship about acquiring a related key based on a root key according to an embodiment of the disclosure.

(2) Key distribution includes generating a key encryption key and a message authentication key based on the acquired root key, and performing negotiation on a data encryption key to obtain the data encryption key. Referring to FIG. 3, the message authentication key and the key encryption key may be correspondingly derived from the root key, and a traffic encryption key, i.e., the data encryption key, is further obtained using the key encryption key.

In some embodiments of the disclosure, the key distribution includes the following operations.

The client sends a key request to the server. The key request includes a random number Nh.

After the key request is received, the server generates a key encryption key KEK, an uplink message authentication key HMAC_key1 and a downlink message authentication key HMAC_key2 based on the root key AK and the random number Nh. The key encryption key KEK is calculated according to the following formula:

$$KEK=\text{truncate\_128}\{SHA1[(AK|0^{\wedge}44)\oplus Nh]\}, \text{ where } 0^{\wedge}44 \text{ denotes a digit "0" repeated for 44 times, and } Nh \text{ denotes a 64-bit random number.}$$

The uplink message authentication key is calculated according to the following formula:

$$HMAC\_key1=\text{truncate\_160}\{SHA1[(AK|36^{44})\oplus Nh]\}.$$

The downlink message authentication key is calculated according to the following formula:

$$HMAC\_key2 = truncate\_160\{SHA1[(AK|36^{44}) \oplus Nh]\}.$$

$36^{44}$ represents that the 128-bit root key AK is followed by a digit "0X36" repeated for 44 times to form a 352-bit string, and a hash operation is performed on the 480-bit string, an exclusive or operation is performed on the 480-bit string obtained after the hash operation and the random number Nh.

Negotiation on a data encryption key TEK is performed between the client and the server. Herein, the client sends a message for a negotiation request to the server. A message for the negotiation request is encrypted using the KEK, and HMAC_key1 is taken as a key of a message digest for the negotiation request.

After the request is received, the server encrypts a TEK parameter list using the KEK and sends the encrypted TEK parameter list to the client, and HMAC_key2 is taken as a key for a message digest for the sent encrypted TEK parameter list.

(3) Data encryption includes encrypting to-be-encrypted data using the data encryption key, and implement communication of the data. Herein, the to-be-encrypted data includes a device and operation state parameter, real-time power generation data, marginal cost, real-time power utilization data, an energy storage capacity, an energy storage device state parameter and the like sent to the server by the client.

In some embodiments of the disclosure, each piece of service data in the application layer is encrypted using one or a combination of algorithms of an SM4-CBC, a DES, an AES and an SM1 in the data encryption. Herein, a hash operation is performed on all of the data using the message authentication key, a hash value obtained by the hash operation is attached to the tail of the data, the uplink message authentication key HMAC_key1 is taken as a hash key in the uplink, and the downlink message authentication key HMAC_key2 is taken as a hash key in the downlink. Herein, CBC is a cipher block chaining mode, in which different ciphertext blocks are generated based on repeated plain text blocks.

It can be seen from the above embodiments that, with the method for quantum key fusion-based virtual power plant security communication in the disclosure, security communication of the virtual power plant is implemented by fusing a quantum key manner and a classical encryption manner, which may not only avoid an excessive increase in cost but also greatly improve data security in a communication process. Therefore, a safe, reliable, economical and effective security communication method is provided in the disclosure, thereby improving communication security and reliability of the virtual power plant.

In some embodiments of the disclosure, negotiation on a quantum key is performed by the quantum key server in both the identity authentication and the key distribution described above.

The identity authentication includes the following steps.

The client sends an identity authentication request to the server through the classical channel.

After the identity authentication request is received, the server generates a group of random numbers as a root key AK through the quantum random number generator, and instructs to perform negotiation on a quantum key between the quantum key server L2 and the quantum key server L1.

The negotiation on the quantum key is performed between the quantum key server L2 and the quantum key server L1 according to a predetermined protocol, to obtain a key K_QU2.

The server acquires the key K_QU2, calculates E=AK⊕K_QU2 and sends E to the client.

The client calculates AK'=E⊕K_QU2 and hash(AK') and sends to the server.

The server determines whether hash(AK') is consistent with hash(AK). If hash(AK') is consistent with hash(AK), the server determines that identity authentication for the client is successful. If hash(AK') is not consistent with hash(AK), the server determines that identity authentication is failed and interrupts communication.

The key distribution includes the following operations.

The client and the server generate a message authentication key and a key encryption key KEK corresponding to the root key with taking AK as the root key.

The client instructs to perform negotiation on a quantum key between the quantum key server L1 and the quantum key server L2.

The negotiation on the quantum key is performed between the quantum key server L1 and the quantum key server L2 according to the predetermined protocol, to obtain a key K_QU3.

The client and the server obtain the key K_QU3 and determine the key K_QU3 as a data encryption key.

To-be-encrypted data is encrypted in a data encryption process as described above.

In some embodiments, a one-time quantum key manner may also be used in the key distribution for security communication of the two parties. The key distribution includes the following operations.

Both of the client and the server determine AK as the root key, and then derive a message authentication key from the root key.

Every time when the client communicates with the server, negotiation on a quantum key is performed between the quantum key server L1 and the quantum key server L2.

The negotiation on the quantum key is performed between the quantum key server L1 and the quantum key server L2 according to a BB84 protocol, to obtain a key K_QU4.

The client and the server obtain the key K_QU4, and determine the key K_QU4 as the data encryption key.

Although a large number of quantum keys are used in the above manner, absolute security of the data may be ensured.

In some embodiments of the application, regarding a multicast condition, not only the above communication security is taken into account, but also authentication and an updating process of a group key caused by joining and exiting of a client are taken into account. First, multicast generally includes multicast of information to all CVPPs from each electricity market service system, including information about electricity tariff of various types of energy in a current time period, an energy requirement in a future time period and the like, and further including requirement information of each electricity assisted market such as service information of primary frequency regulation, automatic power generation control, peak regulation, reactive power regulation, spinning reserve and black start. For example, it is assumed that a certain electricity market service system includes 5 CVPPs, and the electricity market sends a message about an energy requirement bidding scheme to 5 clients in a multicast manner, a multicast center is the electricity market service system and the clients in the multicast is the five CVPPs.

Figure 4:
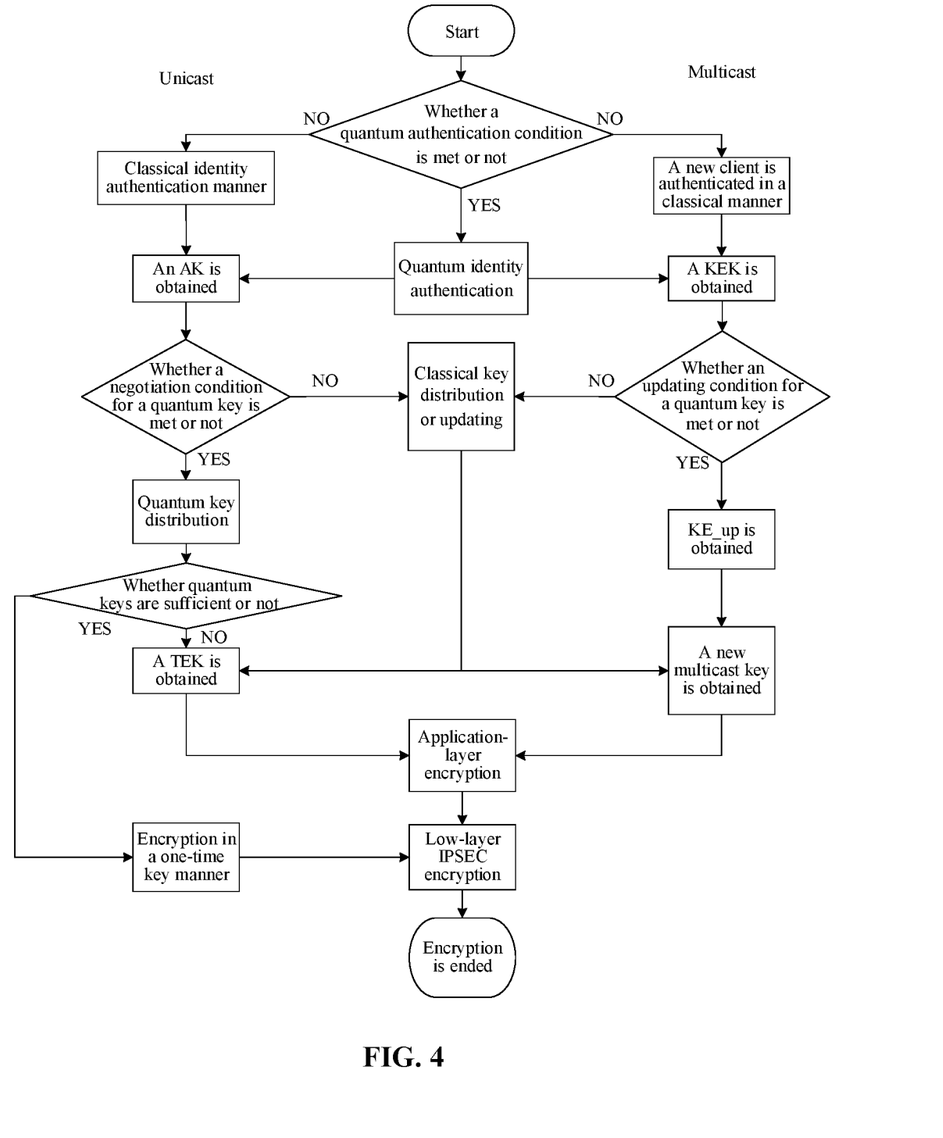
FIG. 4 is a flowchart of unicast or multicast communication performed in a virtual power plant according to an embodiment of the disclosure.

Therefore, on the basis of the solution disclosed in the disclosure, if communication is multicast communication, a server is configured to perform multicast communication with multiple clients. Referring to FIG. 4 which is a flowchart of unicast or multicast communication performed in a virtual power plant in the disclosure, the virtual power plant communication method further includes the following steps 1 to 3.

1: Group Key Initialization, which is Implemented as Follows

Before initialization, each of the clients is registered at the server, and obtains a registration value.

Each of the clients sends the registration value and a selected random number B1, B2, . . . , or Bn to the server, where n denotes the number of the clients and Bn is the random number selected by the client n.

After the random numbers are received, the server calculates B1*B2* . . . *Bn[G] as a group key, where G denotes a base point of an elliptic cryptography. On the basis that the solution is implemented using the elliptic cryptography, an elliptic curve E(a, b) is used and the base point is represented as G(xG, yG).

For each of the clients, when sending the group key to the client, the server sends data to the respective client based on a product of the random numbers of the clients other than the respective client and the basic point and parameters of an elliptic curve of the elliptic cryptography. The data is represented as follows: Ci=B1* . . . *Bi−1*Bi+1* . . . *Bn[G], where Ci denotes data for the i-th client.

After the data is received, the client calculates a group key based on the data and the random number. For example, a client 1 calculates C*B1 as the group key.

In such a manner, even though the transmitted key Ci is attacked, the group key may not be obtained because the attacker does not know the random number Bi of the client.

2: New Client Authentication

When a new client M1 wishes to join a multicast group of the server D1 and the client has known the elliptic curve for multicast encryption, the basic point G and a public key P of the server, the new client obtains the group key by the following steps.

The new client calculates h(1)=SM3(Nm|ID_M1) and sends a request for joining the multicast group to the server. The request includes a random number Nm, identity information ID_M1 of the new client M1, a public key PM of the new client and h(1). SM3 denotes a hash algorithm. A message about the request is encrypted using the public key P of the server according to an encryption formula SM2 [Nm|ID_M1|PM|h(1)]$_p$, where SM2 denotes elliptic curve cryptography.

After the message about the request is received, the server D1 decrypts the message using a private key and sends to the new client M1 a message for instructing the new client M1 to send an identity authentication material.

After the new client M1 receives the message sent by the server, if the new client has a registration value, the registration value KM1 of the new client along with a hash value h2=SM3(KM1) are sent to the server. If the new client has no registration value, a certificate cert is sent to the server.

The server D1 performs message authentication according to the hash value h2, to verify the registration value or the certificate. If the verification is successful, the server D1 generates a key encryption key KEK, sends an encrypted key encryption key KEK encrypted using the public key PM of the new client to the new client M1 and allocates a new registration value KM2. If the verification is failed, the authentication is failed and communication is interrupted.

The server D1 calculates the following values:
T1=t[G];
KE_down=T1+s*{hash(KM2)+hash(x)}[G]; and
X={s*hash(x)}[G], where x denotes a currently-used group key, t1 denotes a current time and s denotes a private key of the server D1.

The server D1 calculates a hash value h(3)=SM3(KM2|T1|KE_down|X), and sends to the new client M1, T1 and X, along with h(3) for message authentication.

The new client M1 receives T1 and X, calculates KE_down'=T1+[hash(KM2)]P+X using the known public key P and the registration value KM2, and verifies whether hash(KM2|T1|KE_down'|X) is consistent with h(3). If verification succeeds, the new client M1 generates KE_up, and sends to the server D1, KE_up encrypted using the KEK along with a hash value h(4)=SM3(KE_up). After the message is received, the server D1 calculates (KE_up*KE_down')[G] as a new group key. If verification fails, communication is interrupted.

In such a manner, without significantly increasing calculation amount, identity authentication onto the server D1 may be implemented, that is, bidirectional identity authentication is implemented.

In some embodiments of the disclosure, a process of new client authentication may also be implemented in a quantum key negotiation approach. Herein, the new client M1 is connected with a quantum key server L2, and the server is connected with a quantum key server L1.

The process of new client authentication includes the following operations.

The new client M1 sends an authentication request to the server D1.

After a message about the authentication request is received, the server D1 instructs to perform identity authentication in a quantum manner.

The new client is authenticated in the same authentication manner as in the abovementioned embodiment.

After the authentication is completed, the new client M1 requests to perform negotiation on a quantum key between the quantum key server L2 and the quantum key server L1 according to the predetermined protocol, to obtain a quantum key K_QU5. The new client and the server calculate (K_QU5*KE_down')[G] as a new group key. In such a manner, security of KE_up is guaranteed and security of the group key is improved. In addition, the clients other than in the new client M1 in the multicast group are not provided with a quantum key server.

Alternatively, the new client M1 is provided with a quantum key management device QC, and the quantum key management device is bound at the quantum key server L2. The QC and the L2 share quantum random numbers. The server D1 is directly connected with the quantum key server L1.

The process of new client authentication includes the following operations.

The new client M1 sends an authentication request to the server D1.

After the authentication request is received, the server D1 verifies an identity of the new client M1 in the same manner as in the abovementioned embodiment.

The quantum key server L1 and the quantum key server L2 perform negotiation on a quantum key, to obtain a quantum key K_QU6.

A quantum random number Nc pre-stored between the QC and the L2 is selected, and the L2 calculates E=Nc⊕K_QU6 and sends the calculated E to the new client M1.

The new client calculates K_QU6 using E⊕eNc, and encrypts KE_up using K_QU6 to further implement identity authentication.

3: Group Key Updating

In one of the following two cases, group key updating is performed.

In a first case that a new client desires to join into the group, after bidirectional identity authentication between the new client and the server is completed, the new client directly takes K_group=(KE_up*KE_down)[G] as a new multicast key.

For a client other than the new client in the multicast group, the server D1 encrypts {KE_up, t1, SM3(KM1)} using an original multicast key, and sends to the other client, a message containing the encrypted {KE_up, t1, SM3 (KM1)} attached a hash value h(5)=SM3(KE_down). An encryption formula is represented as follows:

$$SM4[KE\_up|t1|SM3(KM1)]x$$

After the message is received, the other client in the multicast group calculates KE_down"=t1[G]+[SM3(KM1)] P+SM3(x)P according to KE_up, t1 and SM3(KM1) in combination with the known P and x, verifies whether SM3(KE_down") is consistent with h(5), and calculates K_group=(KE_up*KE_down")[G] as a new multicast key if SM3(KE_down") is consistent with h(5).

In a second case if a client exits from the group or time for updating the key arrives, the server sends a message containing a selected random number Nj and a hash value SM3(Nj) thereof to all the clients in the multicast group. The sent data is encrypted using the original multicast key.

After the message is received, the client in the multicast group calculates K_group=Nj[G]+SM3(Nj)]P+SM3(x)P as a new multicast key.

From the abovementioned embodiments, it can be seen that, as compared with the conventional art, the disclosure at least has the following advantages. First, a secure communication solution in which a specific application scenario is taken into account is provided for a service of the virtual power plant. Second, the conventional classical key is fused with an unconditionally secure quantum key, thereby ensuring feasibility and gradual evolution of the virtual power plant security communication solution. Third, a complete communication solution including fusion of a classical key and a quantum key is provided for unicast and multicast communication of the service of the virtual power plant.

A device for quantum key fusion-based virtual power plant security communication is provided in the disclosure, which includes an identity authentication module, a distribution module and an encryption module.

The identity authentication module is configured for identity authentication, which is performed between a client and a server in the virtual power plant based on a communication requirement, to acquire a root key. The server includes a commercial virtual power plant, an electricity market service system or a technical virtual power plant, and the client includes a distributed energy resource, a commercial virtual power plant or a technical virtual power plant.

The distribution module is configured for key distribution, which includes generating a key encryption key and a message authentication key based on the acquired root key, and performing negotiation on a data encryption key to obtain the data encryption key.

The encryption module is configured for data encryption which includes encrypting to-be-encrypted data using the data encryption key, and implement communication of the data.

Herein, a quantum key server is configured to implement negotiation on a quantum key during the identity authentication or the key distribution, and the quantum key obtained by the negotiation is used for implementing the identity authentication or used as the data encryption key.

In some embodiments, the authentication module is configured to send, by the client, information containing identity information, a client certificate, a client hash value and a random number to the server.

The device further includes a receiving module.

The receiving module is configured to, by the server, receive the information sent by the client, verify the information, and if the verification on the information is successful, provide a root key, encrypt the root key using a public key in the certificate and send the encrypted root key to the client.

The authentication module is further configured to perform, by the client, decryption using a private key corresponding to the public key to obtain an identical root key to finish identity authentication.

In some other embodiments of the disclosure, the identity authentication is implemented with a fast authentication approach. Herein, each of the client and the server has a historical data index table. The historical data index table includes items of time, identity information, a historical key and a historical hash value. In each session between the client and the server, a key k recorded as $k_0, k_1, k_2 \ldots$, or $k_n$ may be generated, and a historical key hash value recorded as $h_1, h_2, h_3 \ldots$, or $h_n$. may be generated. An exclusive or operation is performed on a hash value of k and the hash value h to obtain a new historical key hash value, $h_n$ is calculated according to the following formulae.

$$h_1 = SHA1[k_0] \oplus SHA1[k_1], \text{ and}$$

$$h_n = SHA1[h_{n-1}] \oplus SHA1[k_n].$$

where n denotes a natural number larger than 1 and SHA1 denotes a hash algorithm.

Authentication is performed on the client and the server based on the historical data index table.

The root key is provided if the authentication is successful.

In some embodiments, the authentication module is further configured to extract, by the client, a previous key value k, previous time Ti and an index value ind in the index table from the historical data index table.

The client calculates a hash value using the previous key value, the previous time and the index value, and sends the hash value along with the identity information of the client and the random number to the server as a message. The message is encrypted using the previous key value and is attached with the index value. The message is represented as ESM4[SHA1(k|Ti|Ni|ind)|ID_DER|Ni]_k|ind. ESM4 denotes a commercial cryptographic algorithm, k denotes an encryption key, Ti denotes previous time, Ni denotes a random number, ind denotes an index value and ID_DER denotes identity information of the client.

After the above message is received, the server retrieves and extracting information corresponding to the index value in the message from the historical data index table in the server according to the index value, decrypts the message using the encryption key, compares the identity information of the client obtained by decryption to acquire an identity of the client, calculates a hash value using a previous time, an encryption key, an index value and a random number corresponding to the index value in the index table, and compares the calculated hash value with the hash value sent by the client. If the calculated hash value is consistent with the hash value sent by the client, the identity of the client is conformed to be real and effective, and authentication on the client is successful, and the historical hash value, the historical key and time information in the historical data index table are updated. If the calculated hash values is not consistent with the hash value sent by the client, it is determined that identity authentication is failed, and the communication is interrupted.

The server generates a new random number Nj, and sends information about the confirmation together with new time T to the client as a message. The message is encrypted using k according to an encryption formula represented as Encrypt $(Nj|T)_k$.

After the message is received, the client decrypts the message to obtain the new random number Nj and the new time T.

The server and the client calculate a new root key AK based on the random numbers Ni and Nj, the new time T and the new historical hash value h according to a calculation formula for the root key AK represented as follows:

$AK$=Truncate_128[$SHA1(Ni|Nj|T|h)$], where Truncate_128 represents extraction of first 128 bits of a digit.

In some embodiments, the distribution module is further configured to send, by the client, a key request to the server. The key request includes a random number Nh.

After the key request is received, the server generates a key encryption key KEK, an uplink message authentication key HMAC_key1 and a downlink message authentication key HMAC_key2 based on the root key AK and the random number Nh. The key encryption key KEK is calculated according to the following formula:

$KEK$=truncate_128{$SHA1[(AK|0^44) \oplus Nh]$}, where $0^44$ denotes a digit "0" repeated for 44 times, and Nh denotes a 64-bit random number.

The uplink message authentication key is calculated according to the following formula:

$HMAC\_key1$=truncate_160{$SHA1[(AK|36^{44}) \oplus Nh]$}.

The downlink message authentication key is calculated according to the following formula:

$HMAC\_key2$=truncate_160{$SHA1[(AK|36^{44}) \oplus Nh]$}.

$36^{44}$ represents that the 128-bit root key AK is followed by a digit "0X36" repeated for 44 times to form a 352-bit string, and a hash operation is performed on the 480-bit string, an exclusive or operation is performed on the 480-bit string obtained after the hash operation and the random number Nh.

Negotiation on the data encryption key TEK is performed between the client and the server. Herein, the client sends a message for a negotiation request to the server. The request for the negotiation request is encrypted using the KEK, and HMAC_key1 is taken as a key of the message digest for the negotiation request.

After the request is received, the server encrypts a TEK parameter list using the KEK and sends the encrypted TEK parameter list to the client, and HMAC_key2 is taken as a key for a message digest for the sent encrypted TEK parameter list.

In some embodiments, each piece of service data in the application layer is encrypted using one or a combination of algorithms of an SM4-CBC, a DES, an AES and an SM1 in the data encryption. Herein, a hash operation is performed on all of the data using a message authentication key, a hash value obtained by the hash operation is attached to the tail of the data, the uplink message authentication key HMAC_key1 is taken as a hash key in the uplink, and the downlink message authentication key HMAC_key2 is taken as a hash key in the downlink.

In some embodiments, negotiation on a quantum key may also be performed by the quantum key server during the identity authentication. Herein, each of the client and the server has a quantum key server, and the client is provided with a quantum key management device. Before the client communicates with the server, the quantum key management device of the client is bound and registered at the quantum key server in advance, and the quantum key server instructs the quantum random number generator to generate a large number of random numbers, to be stored as keys in the quantum key server and the quantum key management device of the client. The quantum key management device and the quantum key server L2 of the client share the quantum random number as the keys, and the server is directly connected with the quantum key server L1.

The authentication module is configured to perform operations as follows:

The client sends a data transmission request to the server.

After the request is received, the server generates a random number Nb and sends the random number Nb and a quantum identity authentication requirement to the client.

After the quantum identity authentication requirement is received, the client sends service information to the bound quantum key server L2 through the quantum key management device QC of the client. The information includes information about that the server requests performing quantum identity authentication on the client.

After the service information of the client is received by the quantum key server L2, the quantum key server L1 of the server performs negotiation on a quantum key with the quantum key server L2 of the client, and after the negotiation on the quantum key is completed, the client and the server obtain a key K_QU1 agreed.

The server generates a random number as a root key AK, calculates a signal $E=AK \oplus K\_QU1$ and sends the signal to the quantum key server L2 through a classical channel.

After the signal E is received, the quantum key server L2 calculates $AK'=E \oplus K\_QU1$, selects a quantum random number Ni pre-stored between the client and the quantum key server L2 and calculates $ST=AK' \oplus Ni$. Then, the quantum key server L2 sends a message containing ST, a pointer ptr of the random number Ni, a length long and hash (AK') to the client.

After the message is received, the client extracts the random number Ni using the pointer ptr of the random number and the length long, calculates $AK''=ST \oplus Ni$ and sends a message digest $HMAC(AK'')_{Nb}$ to the server.

After the above message digest is received, the server calculates $HMAC(AK)_{Nb}$ and determines whether $HMAC(AK)_{Nb}$ is consistent with $HMAC(AK'')_{Nb}$. If $HMAC(AK)_{Nb}$ is consistent with $HMAC(AK'')_{Nb}$, the servers confirms the identity of the client and uses the AK as the root key. If $HMAC(AK)_{Nb}$ is not consistent with $HMAC(AK'')_{Nb}$, the server determines that authentication is failed and ends communication.

In some embodiments of the disclosure, negotiation on a quantum key is performed by the quantum key server in both of the identity authentication and the key distribution described above.

The authentication module is further configured to perform the following operations. The client sends an identity authentication request to the server through the classical channel. After the identity authentication request is received, the server generates a group of random numbers as a root key AK through the quantum random number generator, and instructs to perform negotiation on a quantum key between the quantum key server L2 and the quantum key server L1. The negotiation on the quantum key is performed between the quantum key server L2 and the quantum key server L1 according to a predetermined protocol, to obtain a key K_QU2. The server acquires the key K_QU2, calculates E=AK⊕K_QU2 and sends E to the client. The client calculates AK'=E⊕K_QU2 and hash(AK') and sends to the server. The server determines whether hash(AK') is consistent with hash(AK). If hash(AK') is consistent with hash (AK), the server determines that identity authentication for the client is successful. If hash(AK') is not consistent with hash(AK), the server determines that identity authentication is failed and interrupts the communication.

The distribution module is configured to perform the following operations. The client and the server generate a message authentication key and a key encryption key KEK corresponding to the root key with taking AK as the root key. The client instructs to perform negotiation on a quantum key between the quantum key server L1 and the quantum key server L2. The negotiation on the quantum key is performed between the quantum key server L1 and the quantum key server L2 according to the predetermined protocol, to obtain a key K_QU3. The client and the server obtain the key K_QU3 and determine the key K_QU3 as a data encryption key.

In some embodiments, if communication is multicast communication, a server is configured to perform multicast communication with multiple clients.

The device further includes a group key initialization module.

The group key initialization module is configured to perform the following operations.

Each of the clients is registered at the server, and obtains a registration value.

Each of the clients sends the registration value and a selected random number B1, B2, . . . , or Bn to the server After the random numbers are received, the server calculates B1*B2* . . . *Bn[G] as a group key, where G denotes a base point of an elliptic cryptography.

For each of the clients, when sending the group key to a client, the server sends data to the respective client based on a product of the random numbers of clients other than the respective client and the basic point and parameters of an elliptic curve of the elliptic cryptography. The data is represented as follows: Ci=B1* . . . *Bi−1* Bi+1* . . . *Bn[G], where Ci is data for the i-th client.

After the data is received, the client calculates a group key based on the data and the random number.

The authentication module is further configured for new client authentication as follows. When a new client M1 wishes to join a multicast group of the server D1 and the client has known the elliptic curve for multicast encryption, the basic point G and a public key P of the server, the new client obtains the group key by the following steps. The new client calculates h(1)=SM3(Nm|ID_M1) and sends a request for joining the multicast group to the server. The request includes a random number Nm, identity information ID_M1 of the new client M1, a public key PM of the new client and h(1). SM3 denotes a hash algorithm. A message about the request is encrypted using the public key P of the server according to an encryption formula SM2[Nm|ID_M1|PM|h(1)]$_p$, where SM2 denotes elliptic curve cryptography.

After the message about the request is received, the server D1 decrypts the message using a private key and sends to the new client M1 a message for instructing the new client M1 to send an identity authentication material. After the new client M1 receives the message sent by the server, if the new client has a registration value, the registration value KM1 of the new client along with a hash value h2=SM3(KM1) are sent to the server. If the new client has no registration value, a certificate cert is sent to the server. The server D1 performs message authentication according to the hash value h2, and verifies the registration value or the certificate. If the verification is successful, the server D1 generates a key encryption key KEK, sends an encrypted key encryption key KEK encrypted using the public key PM of the new client to the new client M1 and allocates a new registration value KM2. If the verification is failed, the authentication is failed and communication is interrupted.

The server D1 calculates the following values:
T1=t1[G];
KE_down=T1+s*{hash(KM2)+hash(x)}[G]; and
X={s*hash(x)}[G], where x is a currently-used group key, t1 is a current time and s is a private key of the server D1.

The server D1 calculates a hash value h(3)=SM3 (KM2|T1|KE_down|X), and sends to the new client M1, T1 and X along with h(3) for message authentication.

The new client M1 receives T1 and X, calculates KE_down'=T1+[hash(KM2)]P+X using the known public key P and the registration value KM2, and verifies whether hash(KM2|T1|KE_down'|X) is consistent with h(3). If verification succeeds, the new client M1 generates KE_up, and sends to the server D1, KE_up encrypted using the KEK along with a hash value h(4)=SM3(KE_up). After the message is received, the server D1 calculates (KE_up*KE_down')[G] as a new group key. If verification is failed, the communication is interrupted.

Group key updating is described as follow.

In one of the following two cases, group key updating is required.

In a first case that a new client desires to join into the group, after bidirectional identity authentication between the new client and the server is completed, the new client directly takes K_group=(KE_up*KE_down)[G] as a new multicast key.

For a client other than the new client in the multicast group, the server D1 encrypts {KE_up, t1, SM3(KM1)} using an original multicast key, and sends to the other client, a message containing the encrypted {KE_up, t1, SM3(KM1)} along with a hash value h(5)=SM3(KE_down). An encryption formula is represented as follows:

$$SM4[KE\_up|t1|SM3(KM1)]_x.$$

After the message is received, the other client in the multicast group calculates KE_down"=t1[G]+[SM3(KM1)]P+SM3(x)P according to KE_up, t1 and SM3(KM1) in combination with the known P and x, verifies whether SM3(KE_down") is consistent with h(5), and calculates K_group=(KE_up*KE_down")[G] as a new multicast key if SM3(KE_down") is consistent with h(5).

In a second case if a client exits from the group or time for updating the key arrives, the server sends a message containing a selected random number Nj and a hash value SM3(Nj) thereof to all the clients in the multicast group. The sent data is encrypted using the original multicast key.

After the message is received, the client in the multicast group calculates K_group=Nj[G]+SM3(Nj)]P+SM3(x)P as a new multicast key.

In some embodiments of the disclosure, the process of new client authentication may also be implemented in a quantum key negotiation manner. Herein, the new client M1 is connected with a quantum key server L2, and the server is connected with a quantum key server L1.

The authentication module is configured for new client authentication by the following operations.

The new client M1 sends an authentication request to the server D1.

After a message about the authentication request is received, the server D1 instructs to perform identity authentication in a quantum manner.

The new client is authenticated in the same authentication manner as in claim 9.

After the authentication is completed, the new client M1 requests to perform negotiation on a quantum key between the quantum key server L2 and the quantum key server L1 according to the predetermined protocol, to obtain a quantum key K_QU5. The new client and the server calculate (K_QU5*KE_down')[G] as a new group key.

Alternatively, the new client M1 is provided with a quantum key management device QC, and the quantum key management device is bound at the quantum key server L2. The QC and the L2 share the quantum random numbers. The server D1 is directly connected with the quantum key server L1.

The process of new client authentication includes the following operations.

The new client M1 sends an authentication request to the server D1.

After the authentication request is received, the server D1 verifies an identity of the new client M1 in the same manner as in claim 9.

The quantum key server L1 and the quantum key server L2 perform negotiation on a quantum key, to obtain a quantum key K_QU6.

A quantum random number Nc pre-stored between the QC and the L2 is selected, and the L2 calculates E=Nc⊕K_QU6 and sends the calculated E to the new client M1.

The new client calculates K_QU6 using E⊕Nc, and encrypts KE_up using K_QU6 to further implement identity authentication.

A computer storage medium is further provided according to an embodiment of the disclosure, on which a computer-executable instruction is stored. The computer-executable instruction, when being executed, can implement the method for quantum key fusion-based virtual power plant security communication according to one or more of the abovementioned embodiments, for example, the method as shown in FIG. 3 and/or FIG. 4.

Those skilled in the art should know that above discussions about any embodiment are only exemplary and are not intended to limit the scope (including the claims) of the disclosure into these examples. With the concept of the disclosure, the above embodiments or technical features in different embodiments may also be combined, and the steps may be implemented in any sequence. Also, many other modifications in different aspects of the disclosure may be made, which are not provided in details for simplicity.

The embodiments of the disclosure are intended to cover all substitutions, modifications and transformations falling within the wide scope of the appended claims. Therefore, any omissions, modifications, equivalent substitutions, improvements and the like made within the spirit and principle of the disclosure shall fall within the scope of protection of the disclosure.

The invention claimed is:

1. A method for quantum key fusion-based virtual power plant security communication, comprising:
   identity authentication: performing identity authentication between a client and a server in a virtual power plant based on a communication requirement, to acquire a root key, wherein the server comprises a commercial virtual power plant, an electricity market service system or a technical virtual power plant, and the client comprises a distributed energy resource, a commercial virtual power plant or a technical virtual power plant;
   key distribution: generating a key encryption key and a message authentication key based on the acquired root key, and performing negotiation on a data encryption key to obtain the data encryption key,
   wherein the key distribution comprises:
     at the client, sending a key request to the server, wherein the key request comprises a random number Nh;
     at the server, after receiving the key request, generating a key encryption key KEK, an uplink message authentication key HMAC_key1 and a downlink message authentication key HMAC_key2 based on the root key AK and the random number Nh, wherein the key encryption key KEK is calculated according to the following formula: KEK=truncate_128{SHA1[(AK|0^44)⊕Nh]}, wherein 0^44 denotes a digit "0" repeated for 44 times, and Nh denotes a 64-bit random number, the uplink message authentication key is calculated according to the following formula: HMAC_key1=truncate_160{SHA1[(AK|36$^{44}$) ⊕ Nh]}, and the downlink message authentication key is calculated according to the following formula: HMAC_key2=truncate_160{SHA1 [(AK|36$^{44}$)⊕ NH]}, wherein 36$^{44}$ represents that the 128-bit root key AK is followed by a digit "0X36" repeated for 44 times to form a 352-bit string, and a hash operation is performed on the 480-bit string, an exclusive or operation is performed on the 480-bit string obtained after the hash operation and the random number Nh;
     at the client and the server, performing the negotiation on the data encryption key TEK, which comprises: at the client, sending a message for a negotiation request to the server, wherein the message for the negotiation request is encrypted using the KEK, and HMAC_key1 is taken as a key for a message digest of the message for the negotiation request; and
     at the server, after receiving the request, encrypting a TEK parameter list using the KEK and sending the encrypted TEK parameter list to the client, wherein HMAC_key2 is taken as a key for a message digest of the sent encrypted TEK parameter list; and
   data encryption: encrypting to-be-encrypted data using the data encryption key, and implementing communication of the data,
   wherein during at least one of the identity authentication or the key distribution, negotiation on a quantum key is performed by a quantum key server, and the quantum key obtained by the negotiation is used for implementing the identity authentication or used as the data encryption key.

2. The method of claim 1, wherein the identity authentication is implemented in a certificate authentication manner, and a certificate is issued to both the client and the server by a trusted third party;
the identity authentication comprises:
at the client, sending information containing identity information, a client certificate, a client hash value and a random number to the server;
at the server, receiving the information sent by the client and verifying the information, and if the verification is successful, providing the root key, and encrypting the root key using a public key in the certificate and sending the encrypted root key to the client; and
at the client, decrypting the encrypted root key using a private key corresponding to the public key to obtain an identical root key, to complete the identity authentication.

3. The method of claim 1, wherein the identity authentication is implemented with a fast authentication approach, wherein each of the client and the server has a historical data index table, the historical data index table containing items of time, identity information, a historical key and a historical hash value, and the fast authentication approach comprises:
for each session between the client and the server, generating a key k recorded as $k_0$, $k_1$, $k_2$ . . . or $k_n$, and generating a historical key hash value recorded as $h_1$, $h_2$, $h_3$ . . . or $h_n$;
performing an exclusive or operation on a hash value of k and the hash value h to obtain a new historical key hash value, wherein $h_n$ is calculated according to formulae as follows:

$$h_1 = SHA1[k_0] \oplus SHA1[k_1], \text{ and}$$

$$h_n = SHA1[h_{n-1}] \oplus SHA1[k_n],$$

wherein n denotes a natural number larger than 1 and SHA1 denotes a hash algorithm;
performing the authentication on the client and the server based on the historical data index table; and
providing the root key if the authentication is successful.

4. The method of claim 3, wherein the step of performing the authentication on the client and the server based on the historical data index table further comprises:
at the client, extracting a previous key value k, previous time Ti and an index value ind from the historical data index table;
at the client, calculating a hash value based on the previous key value, the previous time and the index value, and sending the hash value along with the identity information of the client and a random number to the server as a message, wherein the message is encrypted using the previous key value and is attached with the index value, and the message is represented as $ESM4[SHA1(k|Ti|Ni|ind)|ID\_DER|Ni]_k|ind$, wherein ESM4 denotes a commercial cryptographic algorithm, k denotes an encryption key, Ti denotes the previous time, Ni denotes the random number, ind denotes the index value and ID_DER denotes the identity information of the client;
at the server, after receiving the message, retrieving and extracting information corresponding to the index value in the message from the historical data index table based on the index value, decrypting the message using the encryption key, comparing the decrypted identity information of the client with identity information corresponding to the index value to acquire an identity of the client, calculating a hash value using a previous time, an encryption key, an index value and a random number corresponding to the index value in the index table, and comparing the calculated hash value with the hash value sent by the client; confirming that the identity of the client is real and effective, passing the authentication of the client, and updating items of the historical hash value, the historical key and the time information in the historical data index table, if the calculated hash value is consistent with the hash value sent by the client; and determining that the identity authentication is failed, and interrupting the communication, if the calculated hash value is not consistent with the hash value sent by the client;
at the server, generating a new random number Nj, and sending information about the confirmation along with new time T to the client as a message, wherein the message is encrypted using k according to an encryption formula $Encrypt(Nj|T)_k$;
at the client, after receiving the message, decrypting the message to obtain the new random number Nj and the new time T; and
at the server and the client, calculating a new root key AK based on the random numbers Ni and Nj, the new time T and the new historical hash value h according to a calculation formula as follows:

$AK = Truncate\_128[SHA1(Ni|Nj|T|h)]$, wherein Truncate_128 represents extracting first 128 bits of a digit.

5. The method of claim 1, wherein the data encryption comprises: encrypting each piece of service data in an application layer using one or a combination of algorithms of an SM4-CBC, a DES, an AES and an SM1 in the data encryption, wherein a hash operation is performed on all pieces of the data using the message authentication key, and a hash value obtained by the hash operation is attached to the tail of the data, an uplink message authentication key HMAC_key1 is taken as a hash key in uplink, and a downlink message authentication key HMAC_key2 is taken as a hash key in downlink.

6. The method of claim 1, wherein in a case that the negotiation on the quantum key is performed by the quantum key server during the identity authentication, the client and the server is provided with a first quantum key server and a second quantum key server respectively, and the client is provided with a quantum key management device, wherein before the client communicates with the server, the quantum key management device of the client is bound and registered at the first quantum key server in advance, and the first quantum key server instructs a quantum random number generator to generate a large number of random numbers, to be stored as keys in the first quantum key server and the quantum key management device of the client; the quantum key management device of the client and the first quantum key server share the quantum random numbers as the keys, and the server is directly connected with the second quantum key server,
the identity authentication comprises:
at the client, sending a data transmission request to the server;
at the server, after receiving the request, generating a random number Nb and sending the random number Nb and a quantum identity authentication requirement to the client;
at the client, after receiving the quantum identity authentication requirement, sending service information to the bound first quantum key server through the quantum key management device of the client, wherein the service information comprises information about that the server requests performing quantum identity authentication on the client;

at the first quantum key server, after receiving the service information of the client, performing negotiation on a quantum key between the second quantum key server of the server and the first quantum key server of the client, and acquiring a key K_QU1 agreed by the client and the server if the negotiation on the quantum key is completed;

at the server, generating a random number as a root key AK, calculating a signal E=AK⊕K_QU1 and sending the signal E to the first quantum key server through a classical channel;

at the first quantum key server, after receiving the signal E, calculating AK'=E⊕K_QU1, selecting a quantum random number Ni pre-stored between the client and the first quantum key server of the client, and calculating ST=AK'⊕Ni, and sending a message containing ST, a pointer ptr of the random number Ni, a length long and hash (AK') to the client;

at the client, after receiving the message, extracting the random number Ni based on the pointer ptr of the random number and the length long, calculating AK"=ST⊕Ni and sending a message digest HMAC (AK")$_{Nb}$ to the server; and at the server, after receiving the message digest, calculating HMAC(AK)$_{Nb}$ and determining whether HMAC (AK)$_{Nb}$ is consistent with HMAC(AK")$_{Nb}$, and confirming the identity of the client and taking AK as the root key if HMAC(AK)$_{Nb}$ is consistent with HMAC (AK")$_{Nb}$, and determining that the authentication is failed and ending the communication if HMAC(AK)$_{Nb}$ is not consistent with HMAC(AK")$_{Nb}$.

7. The method of claim 1, wherein in a case that the negotiation on the quantum key is performed by the quantum key server during both the identity authentication and the key distribution, the client and the server have a first quantum key server and a second quantum key server, respectively, the identity authentication comprises:
at the client, sending an identity authentication request to the server through a classical channel;
at the server, after receiving the identity authentication request, generating a group of random numbers as the root key AK through a quantum random number generator, and instructing to perform negotiation on a quantum key between the first quantum key server and a second quantum key server;
performing the negotiation on the quantum key between the first quantum key server and the second quantum key server according to a predetermined protocol, to obtain a key K_QU2;
at the server, acquiring the key K_QU2, calculating E=AK⊕K_QU2 and sending E to the client;
at the client, calculating AK'=E⊕K_QU2 and hash(AK'), and sending AK' and hash (AK') to the server; and
at the server, determining whether hash(AK') is consistent with hash(AK), and determining that the identity authentication for the client is completed if hash(AK') is consistent with hash(AK), and determining that identity authentication is failed and interrupting the communication if hash(AK') is not consistent with hash(AK), the key distribution comprises:
at the client and the server, generating a message authentication key and a key encryption key KEK corresponding to the root key with taking AK as the root key;
at the client, instructing to perform negotiation on a quantum key between the second quantum key server and the first quantum key server;
performing the negotiation on the quantum key between the first quantum key server and the second quantum key server according to a predetermined protocol, to obtain a key K_QU3; and
at the client and the server, acquiring the key K_QU3 and determining the key K_QU3 as the data encryption key.

8. The method of claim 1, wherein if the communication is multicast communication, a server is configured to perform the multicast communication with a plurality of clients, the method further comprises group key initialization, new client authentication and group key updating, wherein the group key initialization comprises:
at the plurality of clients, registering with the server, and obtaining registration values, each for a respective one of the plurality of clients;
at the plurality of clients, sending the respective registration values and the respective selected random numbers B1, B2, . . . , and Bn to the server;
at the server, after receiving the random numbers, calculating B1*B2* . . . *Bn[G] as a group key, wherein G denotes a base point of an elliptic cryptography;
at the server, for each of the plurality of clients, when sending the group key to the respective client, sending data to the respective client based on a product of the random numbers of the clients other than the respective client and the basic point and parameters of an elliptic curve of the elliptic cryptography, wherein the data is represented as follows: Ci=B1* . . . *Bi−1* Bi+1* . . . *Bn[G], wherein Ci denotes data for the i-th client; and
at each of the clients, after receiving the data, calculating a group key based on the data and the random numbers, wherein the new client authentication comprises:
when a new client wishes to join a multicast group of the server, and the elliptic curve for multicast encryption, the basic point G and a public key P of the server are known to the new client, the new client acquires a group key by the following steps:
at the new client, calculating h(1)=SM3(Nm|ID_M1) and sending a request for joining the multicast group to the server, wherein the request contains a random number Nm, identity information ID_M1 of the new client, a public key PM of the new client and h(1), wherein SM3 denotes a hash algorithm, a message for the request is encrypted using the public key P of the server according to an encryption formula SM2[Nm|ID_M1|PM|h (1)]$_p$, wherein SM2 denotes elliptic curve cryptography;
at the server, after receiving the message for the request, decrypting the message using a private key and sending to the new client a message for instructing the new client to send an identity authentication material;
at the new client, after receiving the message sent by the server, sending a registration value KM1 of the new client along with a hash value h2=SM3(KM1) to the server if the new client has the registration value, and sending a certificate to the server if the new client has no registration value;
at the server, performing message authentication according to the hash value h2, to verify the registration value or the certificate; generating a key encryption key KEK, sending an encrypted key encryption key KEK encrypted using the public key PM of the new client to the new client and allocating a new registration value KM2, if the verification is successful; and determining that the authentication is failed and interrupting the communication, if the verification is failed;

at the server, calculating T1, KE_down and X with the following formulas:

$$T1=t1[G];$$

$$KE\_down=T1+s*\{hash(KM2)+hash(x)\}[G]; \text{ and}$$

$$X=\{s*hash(x)\}[G], \text{ wherein } x \text{ denotes a group key being used}, t1 \text{ denotes current time and } s \text{ denotes a private key of the server};$$

at the server, calculating a hash value h(3)=SM3 (KM2|T1|KE_down|X), and attaching the hash value h(3) for message authentication in a message containing T1 and X to the new client; and at the new client, receiving T1 and X, calculating KE_down'=T1+[hash(KM2)]P+X using the known public key P and the registration value KM2, and verifying whether hash(KM2|T1|KE_down'|X) is consistent with h(3);

at the new client, if the verification is successful, generating KE_up, and sending a message containing the KE_up encrypted using the KEK attached with a hash value h(4)=SM3(KE_up) to the server;

at the server, after receiving the message, calculating (KE_up*KE_down')[G] as a new group key; and if the verification is failed, interrupting the communication.

9. The method of claim 8, wherein the new client authentication is implemented in a quantum key negotiation manner, wherein the new client is connected with a first quantum key server, and the server is connected with a second quantum key server, a process of new client authentication comprises:

at the new client, initiating an authentication request to the server;

at the server, after receiving the authentication request, instructing to perform identity authentication in a quantum manner;

performing the new client authentication at the new client;

at the new client, after the authentication is completed, requesting to perform negotiation on a quantum key between the quantum key server and the second quantum key server according to a predetermined protocol to obtain a quantum key K_QU5, wherein (K_QU5*KE_down')[G] is calculated as a new group key by the new client and the server.

10. A non-transitory computer storage medium in which computer-executable instructions are stored, wherein the computer-executable instructions, when being executed, implement a method for quantum key fusion-based virtual power plant security communication, the method comprising:

identity authentication: performing identity authentication between a client and a server in a virtual power plant based on a communication requirement, to acquire a root key, wherein the server comprises a commercial virtual power plant, an electricity market service system or a technical virtual power plant, and the client comprises a distributed energy resource, a commercial virtual power plant or a technical virtual power plant;

key distribution: generating a key encryption key and a message authentication key based on the acquired root key, and performing negotiation on a data encryption key to obtain the data encryption key, wherein the key distribution comprises:

at the client, sending a key request to the server, wherein the key request comprises a random number Nh;

at the server, after receiving the key request, generating a key encryption key KEK, an uplink message authentication key HMAC_key1 and a downlink message authentication key HMAC_key2 based on the root key AK and the random number Nh, wherein the key encryption key KEK is calculated according to the following formula: KEK=truncate_128{SHA1[(AK|0^44)⊕Nh]}, wherein 0^44 denotes a digit "0" repeated for 44 times, and Nh denotes a 64-bit random number, the uplink message authentication key is calculated according to the following formula: HMAC_key1=truncate_160{SHA1[(AK|36$^{44}$)⊕Nh]}, and the downlink message authentication key is calculated according to the following formula: HMAC_key2=truncate_160{SHA1[(AK|36$^{44}$)⊕Nh]}, wherein 36$^{44}$ represents that the 128-bit root key AK is followed by a digit "0X36" repeated for 44 times to form a 352-bit string, and a hash operation is performed on the 480-bit string, an exclusive or operation is performed on the 480-bit string obtained after the hash operation and the random number Nh;

at the client and the server, performing the negotiation on the data encryption key TEK, which comprises: at the client, sending a message for a negotiation request to the server, wherein the message for the negotiation request is encrypted using the KEK, and HMAC_key1 is taken as a key for a message digest of the message for the negotiation request; and at the server, after receiving the request, encrypting a TEK parameter list using the KEK and sending the encrypted TEK parameter list to the client, wherein HMAC_key2 is taken as a key for a message digest of the sent encrypted TEK parameter list; and data encryption: encrypting to-be-encrypted data using the data encryption key, and implementing communication of the data, wherein during at least one of the identity authentication or the key distribution, negotiation on a quantum key is performed by a quantum key server, and the quantum key obtained by the negotiation is used for implementing the identity authentication or used as the data encryption key.

11. The method of claim 8, wherein the group key updating comprises: if a new client desires to join into the group, after bidirectional identity authentication between the new client and the server is completed, directly taking K_group=(KE_up*KE_down)[G] as a new multicast key at the new client;

at the server, encrypting {KE_up, t1, SM3(KM1)} using an original multicast key, and sending a message containing the encrypted {KE_up, t1, SM3(KM1)} attached with a hash value h(5)=SM3(KE_down) to the client other than the new client in the multicast group, wherein an encryption formula for {KE_up, t1, SM3(KM1)} is represented as follows:

$$SM4[KE\_up|t1|SM3(KM1)]_x; \text{ and}$$

at the client other than the new client in the multicast group, after receiving the message, calculating KE_down"=t1[G]+[SM3(KM1)]P+SM3(x)P based on KE_up, t1 and SM3(KM1) in combination with the known P and x, verifying whether SM3(KE_down") is consistent with h(5), and calculating K_group= (KE_up*KE_down")[G] as a new multicast key if SM3(KE_down") is consistent with h(5).

12. The method of claim 8, wherein the group key updating comprises: if a client exits from the group or time for updating the key arrives, at the server, sending a message containing a selected random number Nj and a hash value SM3(Nj) of the selected random number Nj to all of the clients in the multicast group, wherein the message is encrypted using the original multicast key; and at the clients in the multicast group, after receiving the message, calculating K_group=Nj[G]+SM3(Nj)]P+ SM3(x)P as a new multicast key.

13. The method of claim 8, wherein the new client authentication is implemented in a quantum key negotiation manner, wherein the new client is provided with a quantum key management device, and the quantum key management device is bound with a first quantum key server, wherein the quantum key management device and the quantum key server share a quantum random number, and the server is directly connected with a second quantum key server, a process of new client authentication comprises:

at the new client, initiating an authentication request to the server;

at the server, after receiving the authentication request, performing the new client authentication on the new client;

at the second quantum key server and the first quantum key server, performing negotiation on a quantum key, to obtain a quantum key K_QU6;

at the first quantum key server, selecting a quantum random number Nc pre-stored between the quantum key management device and the first quantum key server, and calculating E=Nc⊕K_QU6 and sending the calculated E to the new client; and at the new client, calculating K_QU6 using E⊕Nc, and encrypting KE_up using K_QU6 to implement the identity authentication.

\* \* \* \* \*